United States Patent [19]
Durwald

[11] 3,777,867
[45] Dec. 11, 1973

[54] ROLLER TRACKWAY CONSTRUCTION

[76] Inventor: Dierk Durwald, Westsr. 11, 5802 Wetter/Ruhr, Germany

[22] Filed: Jan. 10, 1972

[21] Appl. No.: 216,482

Related U.S. Application Data
[63] Continuation of Ser. No. 11,543, Feb. 16, 1970, abandoned.

[30] Foreign Application Priority Data
Mar. 25, 1969 Germany..............P 19 15 028.8

[52] U.S. Cl............................................. 193/35 A
[51] Int. Cl.......................................... B65g 13/00
[58] Field of Search..................... 193/35 A, 32, 40; 198/26, 127 R

[56] References Cited
UNITED STATES PATENTS

| | | | |
|---|---|---|---|
| 3,532,201 | 10/1970 | McConnell | 193/35 A |
| 1,508,369 | 9/1924 | Johnson | 198/26 |
| 3,216,547 | 11/1965 | DeGood et al. | 193/32 |
| 1,562,582 | 11/1925 | Parker | 198/26 |

FOREIGN PATENTS OR APPLICATIONS

| | | | |
|---|---|---|---|
| 1,114,737 | 11/1954 | Germany | 193/35 A |

Primary Examiner—Evon C. Blunk
Assistant Examiner—W. Scott Carson
Attorney—John J. McGlew et al.

[57] ABSTRACT

A roller conveyor or roller track includes a delivery end having a stop against which materials which are carried on a pallet are delivered. The delivery area includes control means in the form of a lever which is located adjacent the end stop in a position such that it is depressed by the material or its pallet when it arrives at the delivery point. The lever is connected to control means which is engageable with the next quantity of material or its pallet which is delivered toward the delivery point. The control means is effective to hold the next pallet at a spaced location from the pallet which has already arrived at the delivery point so that it will not interfere with this pallet when the latter is removed such as by a fork truck which is engageable therewith. As soon as the pallet is removed from the delivery point, the next pallet may move forwardly to the end position of the delivery area adjacent the stop in a position at which it may be engaged for removal without interference from the pallet which is next to the delivery area.

8 Claims, 22 Drawing Figures

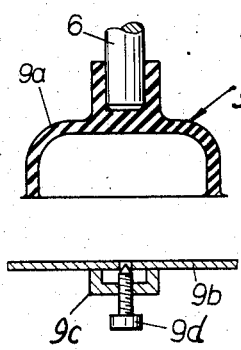
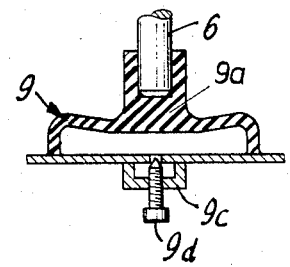
Fig. 8   Fig. 9
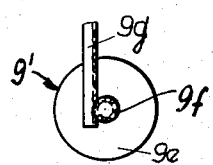
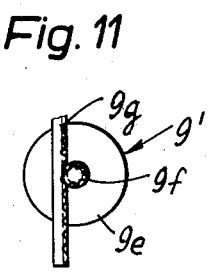
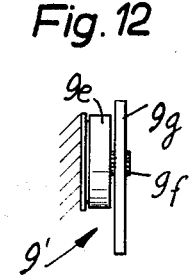
Fig. 11   Fig. 12
Fig. 10
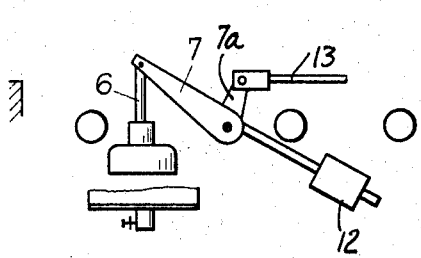
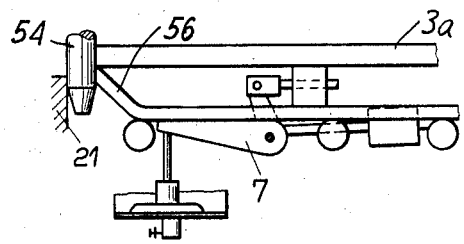
Fig. 14
Fig. 13
Inventor
DIRK DÜRWALD
BY
Mühlen & Foren
ATTORNEY.

ROLLER TRACKWAY CONSTRUCTION

This is a continuation of application Ser. No. 11,543 filed Feb. 16, 1970 now abandoned.

SUMMARY OF THE INVENTION

This invention relates in general to conveyors and in particular, to a new and useful roller track or roller conveyor having a locking and separating device at the delivery point of the conveyor in order to permit the individual removal of the conveyed material.

Roller tracks generally serve to convey materials which may be loaded on pallets which frequently carry varying loads and therefore have different kinetic energies. The pallets usually arrive at the delivery point individually or in groups. If several pallets arrive in groups at the delivery point, it is difficult to lift the front pallets off the conveyor track because the second pallet which is delivered to the delivery point behind the first bears on the front pallet and makes the lifting of the front pallet difficult. In addition, part of the material which projects over the plate edge can be damaged.

A roller track with a locking device is known which consists of a leader which is actuated by a pallet and which effects the engagement of a rack in a gear wheel of a roller. This locking device has a disadvantage that it merely brakes the roller. It is possible, however, that one of the pallets which has no plane skid will slide over the braked roller and move off the trackway. It is also known to provide a damping element which prevents, by hydraulic means, the premature lagging of a plate or pallet which is arranged in front of the delivery point. The hydraulic damping device is very complicated in construction and it is subject to packing problems and is thus difficult to maintain in operating condition. Such a system can only be advantageous at all when the rollers are provided with a hydraulic braking system.

Electrically operated braking systems are also known for roller conveyors and these do not positively prevent the material from sliding further. Such brake systems have the disadvantage that they depend on an energy supply.

The present invention provides a locking and separating device for a roller track which has no packings which might be susceptible to trouble and which is independent of an energy supply. The locking device prevents the material from sliding accidently beyond a predetermined position and in addition, it presents the material or a pallet with the material in an end position on the trackway at a location spaced from any subsequently pallet in a position so that it can be easily lifted off the trackway. The roller trackway is provided with a lever which is actuated by the material which is presented to the delivery point and the lever is connected with a displaceably mounted two arm swivel lever which bears on a stop of the material which is next delivered in back of the first material to arrive in order to hold it in a position separated from the first material. The construction is such that the material which is delivered on the pallet moves over the lever upon its arrival at the delivery point and presses the lever down to produce a movement of a swivel lever into the path of the next pallet to arrive. This swivel lever is located at a position which will engage the pallet so that it holds it away from the first pallet at the delivery point. The swivel lever is constructed so that a stop edge of the lever is deflected inwardly out of an obstructing position by the forward edge of the pallet and this pivots a bevelled trailing edge outwardly until a stop defined thereon is positioned to interfere with further forward movement of the stop which is defined on a spaced location from the front edge of the pallet. According to a further feature of the invention, the lever which is depressed by the first pallet at the delivery point is connected through an intermediate lever and rods with the swivel lever. The movement of the first lever is first transmitted in a simple manner to the swivel lever. In the preferred form a swivel lever is arranged on each side of the roller track and are preferably mounted for pivotal movement about a horizontal axis so that they move into and out of a blocking engagement transversely to the track movement direction. With such an arrangement it is not necessary to take into account the division or arrangement of the rollers in the orientation of the swivel levers on the trackway.

In accordance with another feature of the invention the swivel levers are mounted by a pin which is connected thereto and which is pivotally supported in an oblong slot of a sliding bearing. A connecting rod which is actuated by the first lever which is depressed by the first pallet at the delivery point is moved to effect a displacement of a pin and thus of the swivel lever in its sliding bearing. The swivel levers are advantageously mounted in an arrangement such that limiting stops are effective to control its displacement. The swivel lever is advantageously mounted in a guide frame which forms an easy to assembly unit and it is secured at the necessary point of the side wall of the roller trackway which is set to accommodate the particular pallet lengths which are employed. The bar which interconnects the actuating lever with the swivel levers is interchangeable and will correspond to the required length of the pallets which are employed.

In accordance with another feature of the invention the actuating lever is connected through a time delay device such as a suction diaphragm having an adjustable valve or a brake roller which is actuated by a rack. The time delay device prevents a rapid upward movement of the lever after it is released by the removal of the pallet at the end delivery point. The actuating lever is advantageously provided with a counterweight which effects the lifting of the lever when the latter is no longer loaded by material.

Accordingly, it is an object of the invention to provide a roller conveyor which includes means at a delivery point which is actuatable by the material presented at such point to hold up the further movement of the next quantity of material to be delivered so that it is held at a spaced relationship to the first quantity.

A further object of the invention is to provide a roller trackway which includes a control mechanism in the form of an actuating lever which extends into the trackway and in a position to be engaged by the first pallet to be presented at a delivery point and to become moved thereby to actuate a swivel lever which includes a portion which is presented into the trackway for engagement with the next pallet to be delivered and which is deflected thereby to move a stop into a position to halt the next pallet at a spaced location from the first pallet.

A further object of the invention is to provide a roller trackway which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 8 is an enlarged transverse sectional view of the time delay mechanism indicated in FIG. 7;

FIG. 9 is a view similar to FIG. 8 indicating the time delay mechanism in an operative position;

FIG. 10 is a front elevational view of another embodiment of time delay mechanism;

FIG. 11 is a view similar to FIG. 10 indicating the delay in an advance mechanism and in an advanced state of operation;

FIG. 12 is a side elevational view of the time delay mechanism;

FIGS. 13 to 17 are enlarged side elevational views of the operating mechanism in its various stages of its operation.

GENERAL DESCRIPTION OF THE PREFERRED EMBODIMENTS

Figure 1:
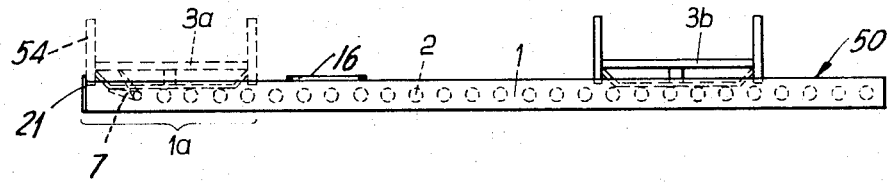
FIG. 1 is a partial side elevational view of a roller trackway constructed in accordance with the invention.
Figure 2:
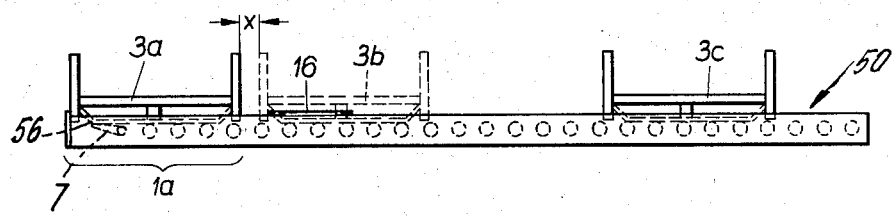
FIGS. 2, 3, and 4 are views similar to FIG. 1 indicating the manner in which successive pallets are presented to a delivery point and lifted off the delivery point.
Figure 3:
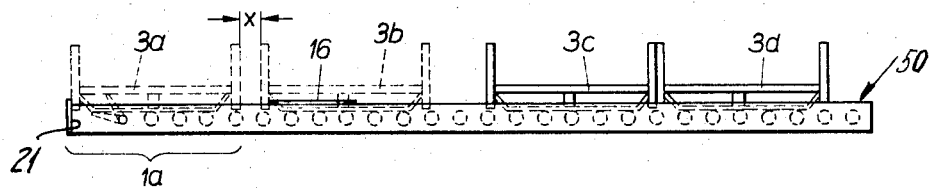
Figure 4:
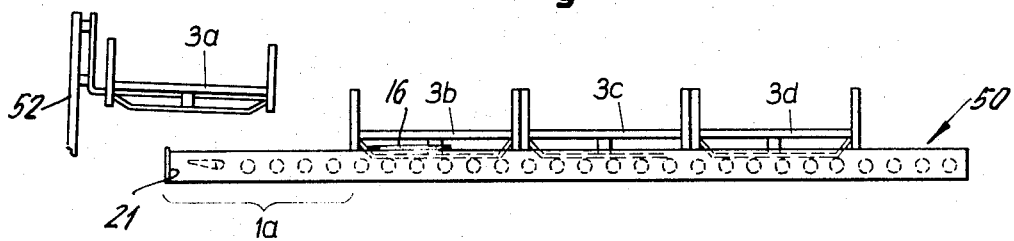

Referring to the drawings, in particular, the invention embodied therein in FIG. 1, comprises a roller conveyor generally designated 50 which includes side walls 1 which rotatably support a plurality of rollers 2 over which pallets, of predetermined size and configuration and designated successively 3a, 3b, 3c, etc., are moved. The pallets 3 are designed to carry the material to be transported and they are presented in succession to a delivery area or delivery point 1a as indicated in FIG. 1. In accordance with the invention control means in the form of an actuating lever 7 and a swivel lever mechanism 16 are associated with the trackway such that when a first pallet 3a arrives at the delivery point, it depresses the control lever 7 to actuate the swivel lever 16 which is effective to prevent the second pallet to arrive, pallet 3b, from moving beyond the location at which it is spaced from the first pallet 3a by the distance x as indicated in FIG. 2. The spacing by the distance x is necessary in order to permit a satisfactory removal of the pallet 3a with its material without hinderance by or interference with the pallet 3b or any of its projecting loads. As additional pallets 3b, 3c and 3d are delivered to the delivery point 1a the foremost one will always be spaced by the distance x away from the next adjacent pallet by the control mechanism so that the foremost one may be lifted off the delivery point such as by a fork lift truck 52 as indicated in FIG. 4. As the pallet 3a is lifted by the fork lift truck 52 the timing mechanism which is associated with the control holds the pallet 3b, 3c, and 3d so that they do not interfere with this removal.

Figure 5:
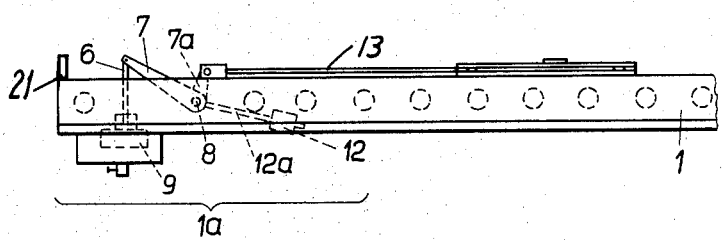
FIG. 5 is a partial side elevational view of the delivery area of the conveyor of FIG. 1.
Figure 6:
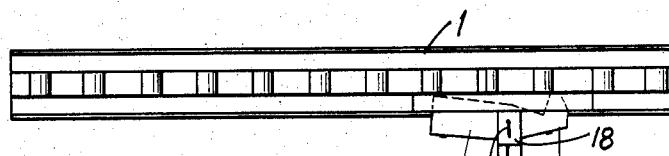
FIG. 6 is a top plan view of the portion of the conveyor indicated in FIG. 5.
Figure 6:
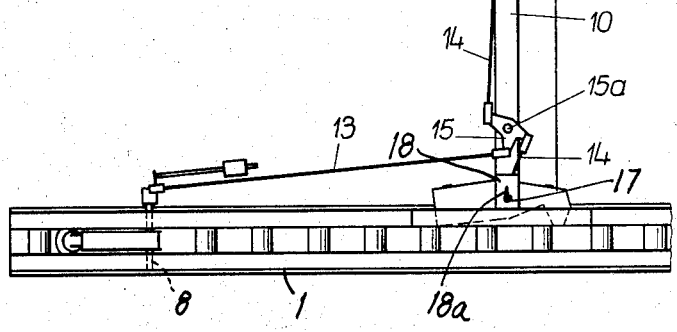
Figure 7:
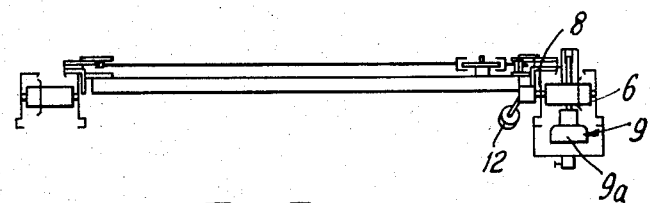
FIG. 7 is a front elevational view of the trackway indicated in FIG. 1.

The control means as best indicated in FIGS. 5, 6 and 7 include an actuating lever 7 which is pivotally mounted on a shaft 8 which is journaled on a side wall 1 and it includes a crank arm portion 7a which is connected through a bar 13 to a lever 15 which is mounted on a vertical pivot pin 15a of a cross beam 10 which is supported between the side walls 1, 1. Respective connecting rods 14, 14 extend between the lever 15 and an associated one of sliding bearing blocks 18, 18. Each bearing blocks 18, 18 contains an oblong slot 18a which provides a confining slot and bearing journal for a pivot pin 17 of an associated swivel lever mechanism or swivel lever 16.

The actuating lever 7 is mounted adjacent the end of the delivery point adjacent an end stop 21 which is adapted to contact the forward edge 54 of each pallet. The lever 7 is depressed by a skid 56 of each pallet to cause the downward movement of a plunger 6 associated with a time delay mechanism generally designated 9. The lever 7 is returned to an actuated position by the action of a counterweight 12 which is suspended on an arm 12a connected to the lever 7 and after release by the time delay device 9.

One example of a time delay device is indicated in FIGS. 8 and 9 and this includes a suction cup member 9a attached to the plunger 6 which cooperates with a counter member or plate 9b with which it may be engaged by suction for a predetermined time as controlled by a control valve 9c. The valve includes an adjustable set screw valve member 9d which may be roated to provide for any desired delay for regulating the time at which the swivel lever will be moved backwardly to an inactive position for engagement with the next pallet in a row.

An alternate embodiment of time delay device is indicated in FIG. 10, 11 and 12 and this includes a rack 9d of a time delay mechanism 9' which includes an eddy current brake cylinder 9e having a pinion 9f. The rack 9d is adapted to be associated with the plunger 6 to cause rotation of the gear 9f and the eddy current brake 9e. The brake 9e is provided with a free running drive which ensures the rapid lowering of the rack 9d during the pivoting of the swivel lever 7 and the movement of the associated plunger 6 which is connected to the rack 9d. When the material on the pallet 3a is lifted off the delivery point, the counterweight 12 effects the return of the lever 7 under the control of the eddy current brake 9e of the delay mechanism 9' or the suction cup and control valve 9c of the delay mechanism 9, in accordance with which it is employed. The lowered state of the rack 9d and the associated plunger 6 is shown in FIG. 11.

Figure 15:
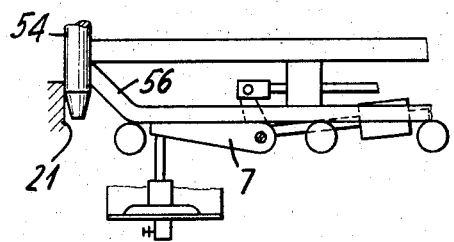
Figure 16:
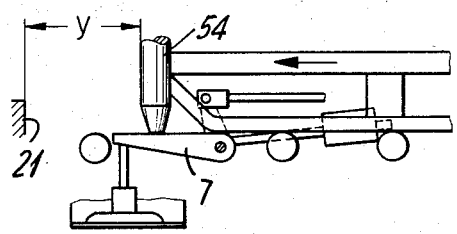
Figure 18:
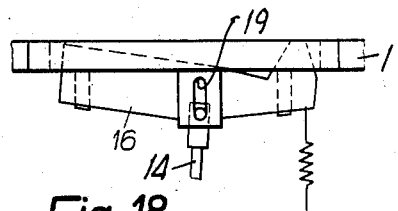
FIGS. 18 to 22 are enlarged top plan views partly in section of the swivel lever mechanism indicating various stages of its operation.
Figure 19:
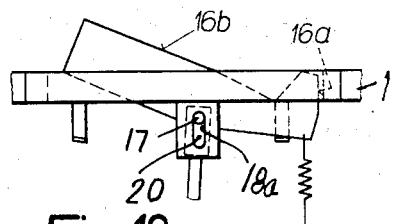
Figure 20:
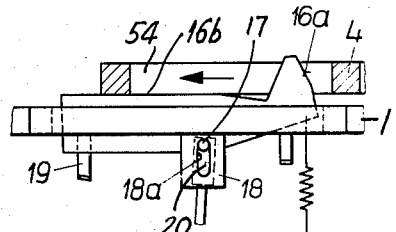
Figure 21:
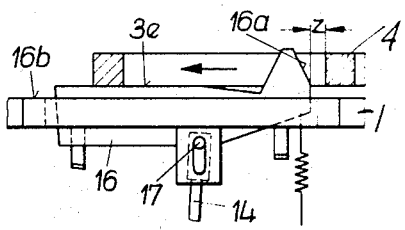

As shown particularly in FIG. 6, the swivel lever mechanism includes two levers 16, 16 which are each pivotal about a vertical axis for the purposes of providing a retarding and then a stop engagement with the pallets which are fed subsequently to the pallet which arrives at the delivery point. A spring 11 connected between the swivel levers 16 provides a restoring force for orienting the levers in a free position. Each rod 14 is provided with an end with a forked head which embraces a pin 17 of the lever 16 and the pin is guided in an oblong slot 18a of the bearing 18. The respective ends of the slot defines limit stops 19 and 20. (see FIGS. 18 to 22) In FIG. 13, the control lever 7 is indicated in a position in which there is no pallet at the delivery point and therefore it projects above the roller trackway at a location at which it may be engaged by any pallet which is delivered to the delivery point. A corresponding position of the swivel lever mechanism 16 is indicated in FIG. 18. When a pallet 3a is moved to the delivery point 1a, as indicated in FIGS. 1 and 14, a front end portion 54 engages the stop 21 at the end of the delivery point and the skid 56 depresses the lever to the substantially horizontal position indicated in FIG. 14. This causes the lever 7 to assume the horizontal position indicated in FIG. 14. This lever movement causes a shifting of the lever 15 and the arms 14, 14 which are connected therewith to position the respective swivel levers 16, 16 as indicated in FIG. 19 in which a stop edge 16a of the swivel lever 16 is retracted but a sliding edge 16b is arranged to protrude into the range of the skid 54. The edge 16b is deflected inwardly by the skid 54 as it is moved in a direction of the arrow indicated in FIG. 19. The depressing of the swivel lever 16 causes the stop edge 16a to project outwardly from the associated side rail 1 into a position at which it engages a stop formation 4 on the skid 54 of the pallet (the next to arrive pallet 3b, for example) to cause it to stop. FIGS. 15 and 20 show a position where the lever 7 is pressed down by the material arranged at the removal point at the end stop 21 while the following material is still moving.

After the pallet 3b is moved beyond the position of FIG. 19 to the position of FIG. 20, it must still move the small distance z until the stop 4 bears against the stop edge 16a. The material on the front pallet 3a still has to cover a longer path y until it strikes against the end stop 21.

Figure 17:
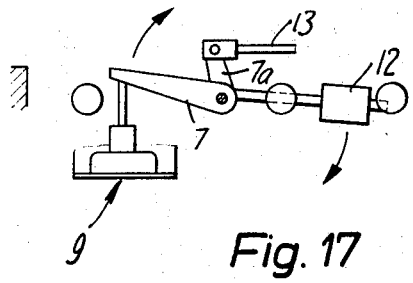
Figure 22:
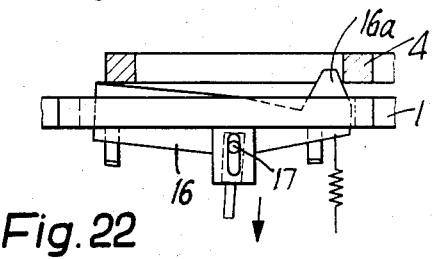

In FIG. 17, the lever 7 is indicated in a position just prior to release by the time delay mechanism 9 after the pallet 3a has been removed and just prior to the movement of the lever in the direction of the arrow indicated. The counterweight 12 effects the lifting force and this will produce a corresponding movement of the swivel mechanism 16 as indicated in FIG. 22. The rods 14 pull the swivels 16 in cooperation with the springs 11 into a vacant position and permit, as indicated in FIG. 4, the material on the pallet 3b to roll to the delivery point 1a. The stop edge 16a is inclined by an amount so that it does not have to push back the material or the pallet when the swivel lever 16 is pulled back into a vacant position.

What is claimed is:

1. In a roller trackway defining a path of load movement for movement of loads, which are substantially uniform in length, successively to a delivery point, and including a plurality of load-supporting rollers rotatably mounted in laterally spaced side rails, arresting means operable, responsive to arrival of a load at the delivery point, to arrest and retain an immediately following load at a holding point, spaced upstream from the delivery point by a distance in excess of the length of a load, until a load then at the delivery point has been removed from the trackway, said arresting means comprising, in combination, a two-arm swivel lever mounted, intermediate its ends, at said holding point adjacent a side rail for bodily displacement laterally of said side rail and pivotal movement relative to said side rail; said lever having a first arm, extending in the direction of travel of the loads and constituting a braking arm, and a second arm, extending in the opposite direction and constituting a stop arm; control means movably mounted at said delivery point and normally projecting into the path of load movement into said delivery point, said control means being engaged and retracted by each load reaching said delivery point and held retracted by the load until the load is removed from the trackway; connecting means connecting said control means to said lever; biasing means biasing said control means to its projecting position and, through said connecting means, biasing said lever bodily laterally of said side rail to a retracted position in which both arms are out of the path of load movement; spring means connected to said stop arm and biasing said stop arm laterally of said side rail to a retracted position out of the path of load movement on said rollers toward said delivery point; said connecting means being operable, responsive to retraction of said control means by a load at said delivery point, to displace said lever bodily laterally of said side rail to project its braking arm into the path of load movement to brake a following load, with said stop arm retracted; said lever being pivoted, responsive to such braking, against the bias of said spring means, to project its stop arm into the path of load movement to arrest a following load at said holding point while a preceding load remains at said delivery point; said control means, upon removal of a load from said delivery point, being moved to its projecting position by said biasing means, and said lever being bodily displaced to its retracted position, by said connecting means, to release an arrested load for movement thereof to said delivery point.

2. Arresting means, as claimed in claim 1, wherein there are a pair of said swivel levers, each pivotally mounted adjacent a respective side rail.

3. Arresting means, as claimed in claim 1, including a stationary bearing block associated with each lever; each lever having a pivot pin intermediate its ends journalled in the associated bearing block; said connecting means being connected to each pin.

4. Arresting means, as claimed in claim 3, in which each bearing block is formed with a relatively elongated slot extending laterally relative to the associated side rail; each pin being engaged in the slot of its associated bearing block; said connecting means being articulated to each pin.

5. Arresting means, as claimed in claim 4, in which said spring means includes a spring connected between the stop arms of the levers; and a respective limit stop engageable with each stop arm and limiting displacement of the stop arm under the bias of said biasing means.

6. Arresting means, as claimed in claim 1, in which said control means is a pivoted control lever; and time delay means operatively associated with said control lever and delaying return of said control lever to the projected position responsive to removal of a load from said delivery point.

7. Arresting means, as claimed in claim 1, in which said control means is a pivotally mounted control lever; and a weight connected to said control lever and biasing said control lever to return to its projected position responsive to removal of a load from said delivery point.

8. A roller trackway for moving a series of loads, such as material piled on pallets, successively to a delivery point, comprising a plurality of rollers arranged along a defined path over which the series of loads is adapted to be moved and having a delivery point adjacent one end; means rotatably supporting said rollers; and control means engageable with the first load moved to the delivery point and including a displaceable member movable by such engagement to stop the next load at a location spaced from the first load to prevent interference of the next load with the first load and to permit the first load to be removed easily from the delivery point; and time delay means connected to said lever and engageable therewith to hold said lever for a period of time after said lever is released by removal of a load positioned at the delivery point; said time delay means comprising a suction cup member engageable with a counter member, and adjustable valve means associated with said counter member for adjusting the time of engagement of said suction cup member with said counter member.

* * * * *